US007988301B2

(12) United States Patent
Kavanagh (10) Patent No.: US 7,988,301 B2
(45) Date of Patent: Aug. 2, 2011

(54) HEAT TRANSFER APPARATUS

(75) Inventor: Martin Kavanagh, Oldham (GB)

(73) Assignee: Digital Projection Limited, Manchester (GB)

(*) Notice: Subject to any disclaimer, the term of this patent is extended or adjusted under 35 U.S.C. 154(b) by 728 days.

(21) Appl. No.: 11/448,505

(22) Filed: Jun. 7, 2006

(65) Prior Publication Data

US 2007/0025107 A1 Feb. 1, 2007

(30) Foreign Application Priority Data

Jun. 8, 2005 (GB) .................................. 0511692.6

(51) Int. Cl.
*G03B 21/16* (2006.01)
*G03B 21/18* (2006.01)
*G03B 21/26* (2006.01)
*F21V 29/00* (2006.01)

(52) U.S. Cl. ............... 353/57; 353/52; 353/60; 353/61; 362/264; 362/294

(58) Field of Classification Search .................... 353/52, 353/54, 55–57, 60–61, 85, 98, 30; 362/294, 362/345, 373, 264, 547; 313/12; 165/10, 165/67–68, 109.1, 179, 185–86, 6, 142; 62/264
See application file for complete search history.

(56) References Cited

U.S. PATENT DOCUMENTS

| | | | |
|---|---|---|---|
| 3,195,628 A | 7/1965 | McAdam | |
| 4,985,815 A * | 1/1991 | Endo | 362/294 |
| 5,022,462 A | 6/1991 | Flint et al. | |
| 5,299,090 A | 3/1994 | Brady et al. | |
| 5,561,338 A * | 10/1996 | Roberts et al. | 313/46 |
| 5,852,339 A | 12/1998 | Hamilton et al. | |
| 5,867,202 A | 2/1999 | Knipe et al. | |
| 5,947,590 A * | 9/1999 | Meuse et al. | 362/264 |
| 6,244,332 B1 | 6/2001 | Gesklin et al. | |
| 6,334,686 B1 | 1/2002 | Shiraishi et al. | |
| 6,411,513 B1 | 6/2002 | Bedard | |
| 6,557,626 B1 * | 5/2003 | O'Sullivan et al. | 165/121 |
| 6,784,601 B2 * | 8/2004 | Kai et al. | 313/46 |
| 6,856,446 B2 | 2/2005 | DiCarlo | |
| 6,870,660 B2 | 3/2005 | DiCarlo | |
| 6,899,444 B1 * | 5/2005 | Biber et al. | 362/345 |
| 6,914,783 B2 | 7/2005 | Rogers et al. | |

(Continued)

FOREIGN PATENT DOCUMENTS

DE 2209733 A 8/1973

(Continued)

OTHER PUBLICATIONS

Search Reports EP and UK.

(Continued)

*Primary Examiner* — Georgia Y Epps
*Assistant Examiner* — Jori S Byrne-Diakun
(74) *Attorney, Agent, or Firm* — Robert C. Klinger (57) ABSTRACT

An apparatus for transferring heat between an object and a fluid, the apparatus comprising at least one set of elongate members, the elongate members each having a tip for contacting the object. The tips of the elongate members generally make a point contact with the object and allow heat to be transferred between the object and a fluid, often air. A gap is provided between adjacent elongate members to facilitate fluid flow around the object and between the elongate members.

27 Claims, 6 Drawing Sheets

U.S. PATENT DOCUMENTS

| | | | | |
|---|---|---|---|---|
| 6,939,010 | B2 * | 9/2005 | Tanaka | 353/52 |
| 6,967,839 | B2 | 11/2005 | Chung et al. | |
| 7,021,768 | B2 | 4/2006 | Fuse et al. | |
| 7,040,763 | B2 * | 5/2006 | Shiraishi et al. | 353/60 |
| 7,156,522 | B2 * | 1/2007 | Plut | 353/31 |
| 7,225,859 | B2 * | 6/2007 | Mochizuki et al. | 165/10 |
| 7,246,922 | B2 * | 7/2007 | Hulick et al. | 362/294 |
| 7,252,408 | B2 * | 8/2007 | Mazzochette et al. | 362/294 |
| 7,284,596 | B2 * | 10/2007 | Larson | 165/80.3 |
| 7,284,868 | B2 * | 10/2007 | Colpaert et al. | 353/97 |
| 7,301,770 | B2 | 11/2007 | Campbell et al. | |
| 7,306,342 | B2 * | 12/2007 | Wu et al. | 353/98 |
| 7,357,537 | B2 * | 4/2008 | Masuoka et al. | 362/346 |
| 7,358,657 | B2 * | 4/2008 | Koelger et al. | 313/113 |
| 7,610,947 | B2 * | 11/2009 | Wang et al. | 165/80.3 |
| 2002/0043360 | A1 * | 4/2002 | Lee | 165/80.3 |
| 2003/0085659 | A1 | 5/2003 | Overmann et al. | |
| 2003/0117686 | A1 | 6/2003 | DiCarlo | |
| 2004/0190245 | A1 | 9/2004 | Tirumala et al. | |
| 2004/0202007 | A1 * | 10/2004 | Yagi et al. | 362/545 |
| 2004/0240207 | A1 * | 12/2004 | Takezawa et al. | 362/264 |
| 2005/0012905 | A1 | 1/2005 | Morinaga | |
| 2005/0073811 | A1 | 4/2005 | Wang et al. | |
| 2005/0117346 | A1 | 6/2005 | Morinaga | |
| 2005/0139346 | A1 | 6/2005 | Huang et al. | |
| 2005/0168996 | A1 | 8/2005 | Koegler et al. | |
| 2005/0179873 | A1 | 8/2005 | Yamasaki et al. | |
| 2006/0028621 | A1 * | 2/2006 | Gupta et al. | 353/52 |
| 2006/0146293 | A1 | 7/2006 | Morimoto | |
| 2006/0203205 | A1 * | 9/2006 | Inamoto | 353/52 |
| 2006/0290891 | A1 * | 12/2006 | Wang et al. | 353/52 |
| 2007/0025107 | A1 | 2/2007 | Kavanagh | |
| 2007/0157627 | A1 | 7/2007 | Hsu | |
| 2007/0211219 | A1 * | 9/2007 | Ko | 353/52 |
| 2008/0298066 | A1 * | 12/2008 | Van De Voorde et al. | 362/264 |

FOREIGN PATENT DOCUMENTS

| | | |
|---|---|---|
| DE | 195 15 122 A1 | 10/1996 |
| EP | 0 938 009 A1 | 1/1999 |
| EP | 0 938 009 B1 | 8/1999 |
| EP | 1 463 112 A2 | 9/2004 |
| EP | 1 731 957 A3 | 12/2006 |
| GB | 429390 | 3/1934 |
| JP | 10190268 A | 7/1998 |
| JP | 410319381 A | 12/1998 |
| JP | 11007829 A | 1/1999 |
| JP | 11340392 A | 12/1999 |
| JP | 02000098491 A | 4/2000 |
| JP | 2002352612 A | 12/2002 |
| JP | 2005 241969 A | 9/2005 |
| JP | 2006 011114 A | 1/2006 |
| WO | WO 93/25332 | 12/1993 |
| WO | WO 2004/057406 A3 | 7/2004 |

OTHER PUBLICATIONS

EP Official Communication, Nov. 7, 2008, 3 pages.
EP Official Communication, Nov. 27, 2008, 7 pages.
European Search Report, Sep. 21, 2006, EPO.

* cited by examiner

HEAT TRANSFER APPARATUS

The present application relates to apparatus for transferring heat between an object and a fluid. More particularly, the present application relates to apparatus for dissipating heat, for example from a lamp. The present application also relates to methods of operating a projector.

Many electro-optical devices contain illumination systems. The illumination systems may, for example, be part of a projection system for the illumination of photographic still frames, as in a 'slide' projector; the illumination of motion picture film in a 'movie' projector; or in the applicant's specific case, the use of the Texas Instruments DLP (Digital Light Projection) elements, for digital projection technology.

It is often desirable to have a high level of illumination, and various types of Arc lamps are a common source of such levels of illumination. However, whatever the light source, a considerable amount of waste heat is generated in production of high illumination levels. This heat generation can prove problematic and becomes more so as more light is needed. Typical arc lamp light sources are in the 3-10 Kilowatt range.

The hottest part of an illumination or projection system is nearest to the lamp, as the lamp is the source of heat. A significant proportion of this heat is radiated and may be absorbed by reflectors which are commonly used in projection systems to gather the maximum possible amount of light from the light source and direct it through the projector and onto the screen. These reflectors, due to their close proximity to the light source, can become extremely hot because of heat transferred directly from the lamp, absorption of visible light (no reflector reflects everything) and absorption of infra red light. Both metal and glass reflectors suffer these heating affects, especially the absorption of long wavelength infrared light radiated from the lamp anode.

The reflectors are typically provided with suitable optical coatings to maximise their reflective properties and it is well known that reflectors, and particularly these coatings, have only a limited lifetime. One common mode of failure for these coatings is that with continuous exposure to high temperatures the coating becomes brittle, and loses efficiency, or may even disintegrate. This causes a noticeable drop in the illumination level, which necessitates the replacement of the reflector assembly. Other common failure modes are distortion of metal reflectors or cracking of glass reflectors, both caused by excessive or uneven heating. These also require reflector replacement. Reflector replacement entails both the cost of a new reflector, and the associated costs of labour and 'down time' whilst the reflector is replaced, and the system re-aligned.

In an attempt to maximise the life of reflectors, several methods of cooling are commonly employed. The use of fans to blow air through the illumination assembly in an effort to dissipate the heat is well known and generally a requirement for cooling the lamp itself as well. This air is normally directed along the optical path, with the air passing on the inside of the reflector and around the lamp assembly, as this is where the hottest temperatures are found and the first priority should be to cool the lamp adequately. It is also a common technique to disperse the heat through a substantial mass of heat conductive material, often in the form of metal 'heat sinks' which have 'fins' to increase the surface area exposed to the surrounding air. These heat sinks rely on having efficient contact with the object to be cooled and a large surface area in contact with surrounding air.

There remain a number of problems associated with known cooling systems. For example, known heat sinks are bulky and increase the size and weight of the projection system. To provide adequate airflow to cool such a projection system, a larger cooling fan may be required and this is likely to generate unwanted noise, as well as increasing the cost of the system. The different aspects of the present application especially in the preferred embodiments attempt to solve or ameliorate at least some of the problems associated with known cooling systems.

Viewed from a first aspect, the present application relates to apparatus for transferring heat between an object and a fluid, the apparatus comprising at least one set of elongate members, the elongate members each having a tip for making a point contact with the object and allowing heat to be transferred between the object and the fluid by creating localized turbulence against a surface of the object. The tips of the elongate members generally make a point contact with the object and allow heat to be transferred between the object and a fluid, often air. A gap is provided between adjacent elongate members to facilitate fluid flow around the object and between the elongate members. This arrangement is advantageous since the elongate members create a turbulent fluid flow in very close proximity to the object, which is particularly effective in transferring heat between them.

The apparatus is preferably suitable for dissipating heat from the object. However, the apparatus may also be suitable for heating or equalising the temperature of the object. For example, a fluid above the temperature of the object may be passed through the apparatus to heat the object.

The apparatus may operate as a heat sink which, at least in preferred embodiments, is lightweight.

A fan or pump is preferably provided to create fluid flow around the elongate members.

The elongate members in each set preferably form an array. The orderly distribution of the elongate members around the object is desirable since it helps transfer heat between the object and the fluid evenly.

The elongate members are generally arranged to cover the heated object at a spacing such as to attain an acceptably even cooling effect. The elongate members may be arranged in one or more sets for convenience and may be arranged to follow the shape of the surface to be cooled. Preferably, however, the elongate members in the or each set are substantially co-planar. In arrangements comprising a plurality of sets of elongate members, the elongate members in adjacent sets are preferably substantially parallel. This facilitates assembly.

The elongate members may be arranged within the or each set substantially parallel to each other. Preferably, the elongate members are arranged such as to contact the surface more or less at right angles in a plane crossing the fluid flow direction for maximum effect. Preferably, however, where the object to be cooled is of circular cross section, the elongate members extend in a radial direction. The included angle between adjacent elongate members is preferably the same for all of the elongate members. The elongate members are additionally preferably arranged to make contact to the surface of the object at a shallow angle when viewed in a plane perpendicular to the fluid flow to accommodate movement of the object with temperature changes.

A support member for the or each set of elongate members is preferably provided. The support member is preferably integrally formed with the associated set of elongate members, for example from the same piece of sheet material. The elongate members may extend in any direction from the support member. Preferably, however, the elongate members extend inwardly. This arrangement is desirable since it allows the elongate members to contact a circular object such as a reflector around its circumference.

The support member(s) is/are preferably mounted in a frame. The support member(s) could be fixed in position. Preferably, however, the support member(s) is/are allowed to move relative to the frame (i.e. to float within the frame). This arrangement is desirable since it accommodates movement of the object relative to the frame, for example when a reflector is being replaced.

The tip of each elongate member may be pointed, but is preferably rounded. This helps ensure that a point contact is created between the member and the object. It will be appreciated that each member may be provided with two or more tips for contacting the object.

Although the width of the elongate members may change along their length, they are preferably of substantially uniform width along their length.

The elongate members are preferably formed from a sheet material. The elongate members in the or each set are preferably formed from a single sheet of material for ease of construction. The sheet material may be laser cut to the desired shape, for example.

The sheet material is preferably resilient to allow the elongate members to conform to the shape of the object, for example when the apparatus and/or object is first installed or during servicing thereof. The resilience of the sheet material and the shallow angle of contact in one plane also allow the elongate members to accommodate any variations in the dimensions of the object to be cooled which may occur, for example, during manufacture or during temperature changes in use.

The sheet material is preferably a metal to provide good thermal conductivity. Most preferably, the elongate members are formed from aluminum. The aluminum is preferably anodised. Most preferably, the aluminum is anodised matte black. The anodising process has the additional benefit of further increasing the resilience of the elongate members.

The apparatus preferably comprises means for circulating the fluid around the elongate members. In the case of a gas, such as air, a fan is preferably provided. The apparatus may also be used in conjunction with a liquid, such as water, and in these cases a pump is preferably provided for pumping the liquid around the elongate members.

The lengths and arrangement of the elongate members in the or each set relative to each other may be varied to accommodate a particular object. For example, the lengths of the elongate members may be varied such that the tips define in plan form a circular, oval, elliptical opening. Preferably, however, the elongate members are of substantially equal length to provide substantially uniform heat dissipation from the object.

The apparatus described herein may be adapted for cooling a reflector for a lamp; or a reflector for a telescope. The apparatus is particularly suitable and has been developed for illumination systems, but can equally be used in many other applications where it is preferred to avoid heavy attachments to a surface or device and instead to create a highly efficient fluid contact to the surface whether for heat transfer or for temperature equalisation. The present application further relates to a projector comprising apparatus as described herein. The projector preferably comprises a fan for circulating fluid around the elongate members.

A splitter is preferably provided for splitting the fluid flow from the fan or pump into first and second components to flow around a reflector. The first component is preferably directed to the exterior of the reflector; and the second component is preferably directed to the interior of the reflector. The splitter preferably comprises a baffle plate. Alternatively, two or more fans/pumps may be provided to create the desired fluid flow to the interior and exterior of the projector (for example a first fan/pump may supply fluid to the exterior of the reflector, and a second fan/pump may supply fluid to the interior of the reflector).

The projector preferably further comprises a photocell (or solar cell) for determining when a lamp in the projector is illuminated. A time recording device is preferably provided for recording the total time that the lamp is illuminated as determined by the photocell. The photocell and/or the time recording device is/are preferably provided inside an insulated housing. At least a portion of the insulated housing preferably comprises first and second members with a gap provided between them (i.e. at least a portion of the housing is preferably double skinned). A cooling fluid is preferably passed between the first and second members to provide additional cooling. The total number of hours for which the lamp is illuminated (lamp hours) may thereby accurately be monitored.

The applicant has identified that the apparatus described herein is particularly effective at cooling a reflector in a projection system. A substantial increase in the cooling of the reflector can be obtained by the use of assemblies that contain a large number of elongate members, preferably in the form of thin 'fingers' in contact with the back of the reflector. Whilst these fingers touch the back of the reflector surface, they do so with a minimal contact area, typically of less than one square millimeter per finger.

One practical implementation is to provide a number of concentric 'rings' of fingers, with each ring fitting onto different planes of the reflector. The rings are preferably mounted together into an assembly which can be mounted onto the outside surface of a reflector, for example using designated mounting points in the reflector mounting structure or the reflector itself. The outer edge detail of the rings is preferably used for alignment of the rings in the assembly. For efficiency the inner ring fingers are preferably set to protrude a short way within the inner diameter of the reflector, as long as this is not in the optical path, to gain additional cooling by interacting with the passing fluid flow within the reflector. The inner ring in this instance touches the edge of the reflector some distance from the tips of the fingers. The provision of a circular ring member at the centre of the smallest ring helps to protect the fingers from being accidentally bent when lamps are changed. The fingers are preferably provided in sets and each set is preferably formed by a member. Typical implementations have around 30-50 fingers per member. The members are preferably spaced apart by 3 to 25 mm along the reflector axis according to the heat loads to be dealt with. For example, 1, 2, 3, 4, 5, 6, 7, or more members may be provided for a reflector. The width, length and pitch of each finger can be varied to obtain a balanced overall cooling effect. The required configuration depends on the size of the reflector being considered and the power it has to handle.

Preferably, the fingers are made from aluminum, as this is lightweight and a good conductor of heat. Since the reflectors vary slightly due to manufacturing tolerances, it is useful if these fingers are 'sprung' against the reflector bowl.

Aluminum is a soft metal with little inherent springiness and on its own would deform in contact with the reflector making the finger rings a "one use" component as well as giving up the small thermal conduction that the contact point offers. However if Aluminum is anodised the hard surface imparts some degree of springiness which remains stable over the operating temperature range of the reflector thus giving better thermal contact and making the finger rings readily re-usable when the reflector is changed. Using sprung fingers has an additional benefit in permitting the reflector to expand and contract without the cooling being adversely affected or applying undue stresses to the reflector, especially important when using glass reflectors.

A particular feature of this approach is that the cooling relies largely on localised turbulence against the surface being cooled rather than thermal conduction, although the (tiny) contact areas of the fingers along with tip vortices will naturally transfer some heat into the fingers where it will be dissipated in the turbulent fluid flow conditions created by the fingers. As a result the multiple fingers need not be made of good thermally conductive materials to be effective though that is still the preferred choice. This is of particular interest where the temperatures are too hot for Aluminum to be used when members of spring steel, beryllium copper, or high temperature alloys could be used effectively.

Figure 1:
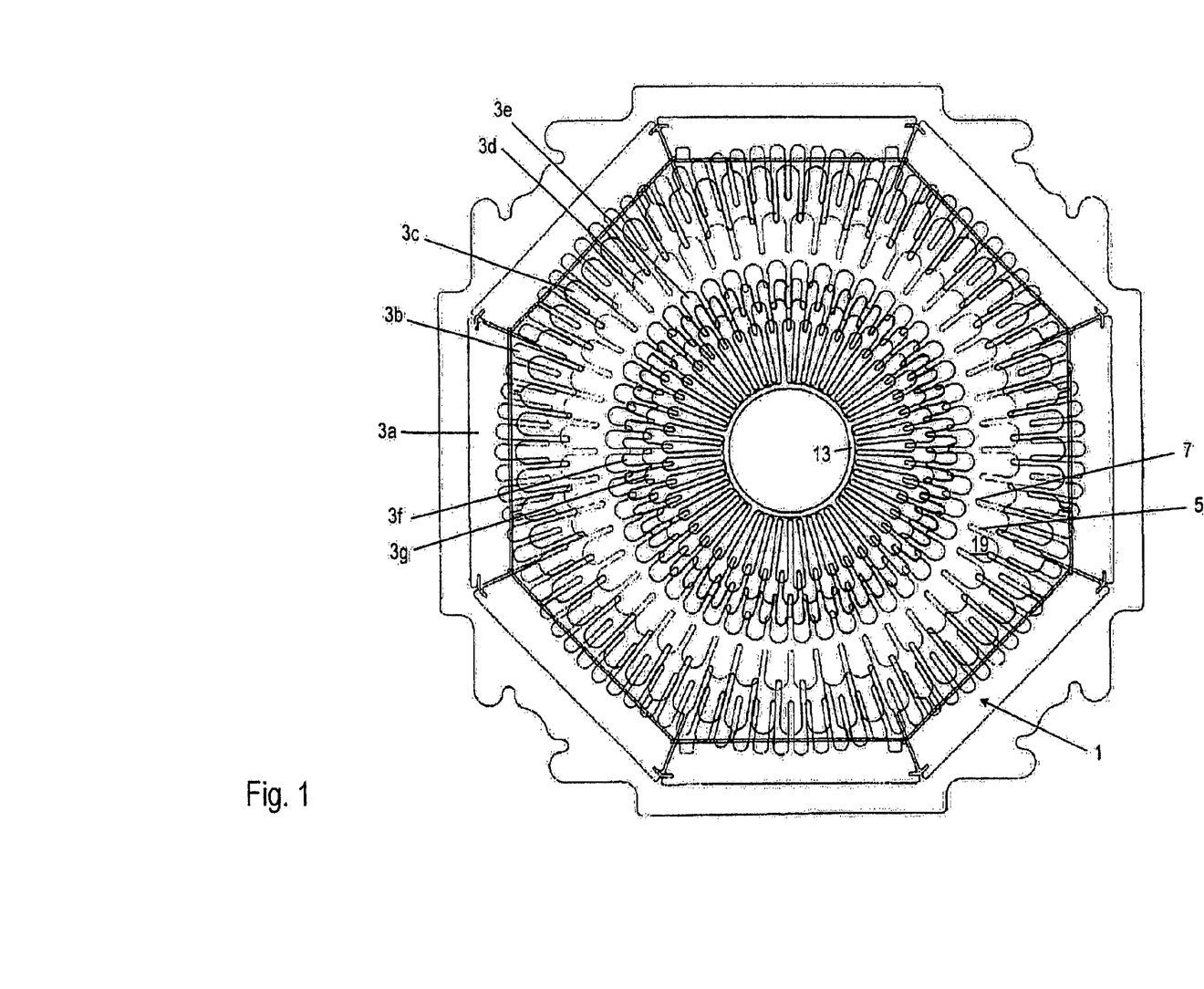
FIG. 1 shows a plan view of a first cooling assembly in accordance with the present invention adapted for cooling a reflector in a projection system.

The arrangements illustrated in FIG. 1 are ideal for producing from Computer Numerically Controlled (CNC) Laser cutting machines. The resulting cut edges are typically rough as a result of the laser cutting and this may enhance the creation of turbulence around the fingers.

Preferably, a cooling system is arranged to supply cooling fluid to both sides of the reflector, to minimise temperature gradients between the two sides of the reflector. This is achieved by having the incoming fluid flow separate into two flows. The first flow passes over the outside of the reflector assembly, where the concentric 'finger' members are, whilst the second flow cools the lamp and the inside of the reflector.

Due to the improved cooling of the reflectors, at least in preferred embodiments of the present invention, lamp modules utilising the technology described herein show a gentler ageing curve than lamp modules without because reflector ageing is greatly reduced. Where loss of light is the reason for lamp replacement this effectively provides a longer service life for the module as the declining useful light output as the lamp ages is no longer compounded with falling reflector efficiency. Additionally, the reflector sets have a service life several times longer with the additional cooling, permitting re-lamping to original specification several times without changing the reflectors, impossible with prior art modules for high power lamps.

Figure 4:
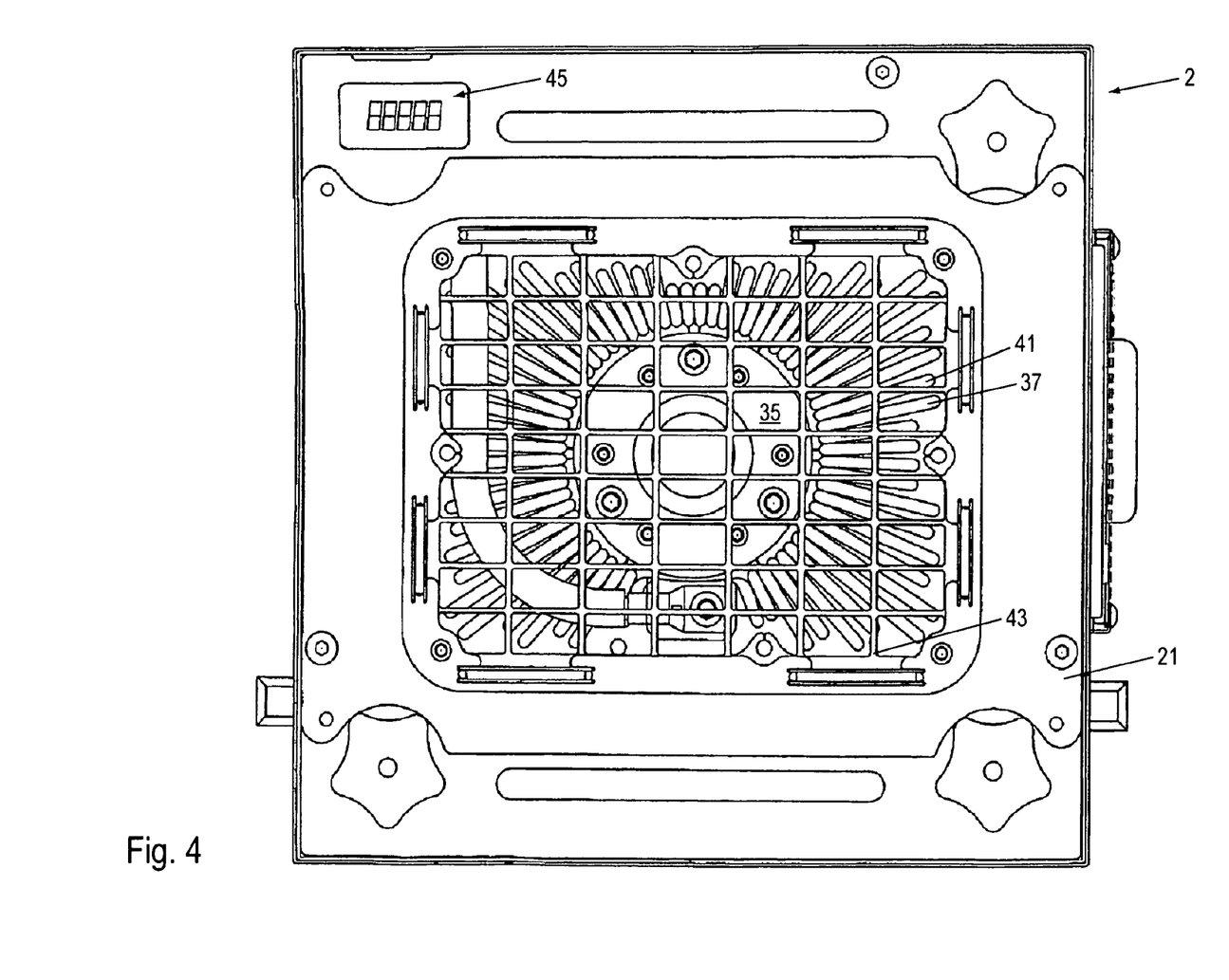
FIG. 4 shows a plan view of the back of a projector in accordance with the present invention.

Additional cooling can be obtained by mounting similar members consisting of multiple fingers around the base of the lamp to help ensure that even high powered lamps are adequately cooled. Further, to prevent light exiting directly from the lamphouse, it is preferable to arrange the 'fingers' in offset rings. In the unlikely situation of the lamp exploding, since there are no direct paths out of the lamp mounting box, no particles of lamp can exit other than by one or more ricochets meaning that if they exit it is with much with less energy and are relatively safe. This makes for a safer assembly. This overlapping fin structure is shown in FIG. 4.

To maintain a cool outer surface to the lamp module—with the benefit that less heat is transferred into the projector chassis and the lamp module may be handled more safely—the hot areas of the module are preferably double skinned with a fluid flow between the skins to keep the temperature down. By this means the outer regions can run at 50-60° C. maximum compared to well over 120° C. for a prior design. This also permits an electronic hour-meter to be safely used in the outer parts of the module, which was not possible before.

Viewed from a yet further aspect, the present application relates to apparatus for dissipating heat from an object, the apparatus comprising at least one set of elongate members, the elongate members each having a tip for contacting the object.

A preferred embodiment of the present invention will now be described, by way of example only, with reference to the accompanying drawings, in which.

Figure 2:
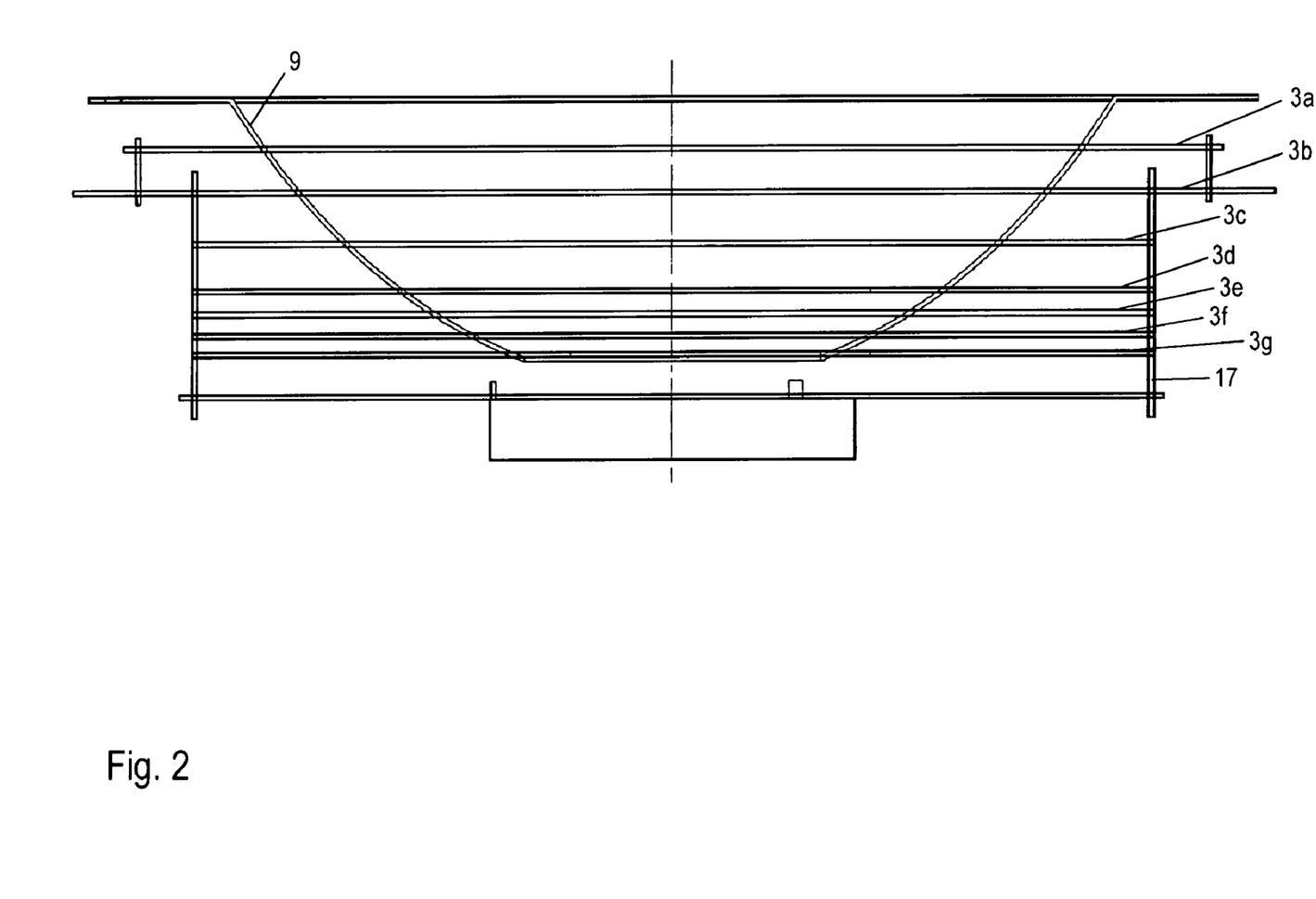
FIG. 2 shows a side view of the first cooling assembly installed on a reflector.

A first assembly 1 for dissipating heat from a projector system 2 in accordance with the present invention is shown in FIGS. 1 and 2. The first assembly 1 comprises a plurality of planar elements 3a-3g (seven in the present embodiment). The planar elements 3a-3g are each provided with a set of elongate members 5 (or 'fingers'), which project radially inwardly. There are approximately fifty elongate members 5 equally spaced around the circumference of each planar element 3a-3g in the present embodiment.

The free end of each elongate member 5 is provided with a rounded tip 7 for making a point contact with a reflector 9 for a Xenon Arc lamp 11. The elongate members 5 in each planar element 3a-3g are arranged such that the tips 7 define circles corresponding to the associated diameter of the reflector 9. Thus, the tips 7 define concentric circles to match the outside surface of the reflector 9.

A protection ring 13 is provided on the inside of the tips 7 of the elongate members 5 defined by the planar element 3g at an end of the first assembly to reduce potential damage during lamp replacement (the planar element 3g defining the smallest circular opening). Detail on the outer edge of each ring provides means to locate them in position in the frame assembly 17.

As shown in FIG. 2, the planar elements 3a-3g are arranged substantially parallel to each other. A frame assembly 17 is provided to mount the planar elements 3a-3g in the desired position. The planar elements 3a-3g are movably mounted in the frame assembly 17 to allow them to be moved within their respective planes. The movement of the planar elements 3a-3g relative to the frame assembly 17 allows the reflector 9 to be more readily located in the desired position, for example when it is being installed or serviced.

A gap 19 is provided between adjacent elongate members 5 in each planar element 3a-3g to form passageways around the reflector 9 through which air may circulate. The circulation of air around and through these passageways provides efficient cooling of the reflector 9 through the creation of vortices and turbulence in the airflow, resulting in much better use of air coming from fans. A fan (not shown) is provided to create the desired airflow.

Preferably, both sides of the reflector 9 are cooled, to minimise differential temperatures between the two sides thereof. This is achieved by having the initial airflow generated by the fan separated into a first flow and a second flow. A baffle plate (not shown) may be provided to form the first and second flows. The first flow passes over the back of the reflector 9 and circulates between the elongate members 5 before exiting the projector system 2. The second airflow passes over the lamp and inner surface of the reflector to provide additional cooling.

Figure 3:
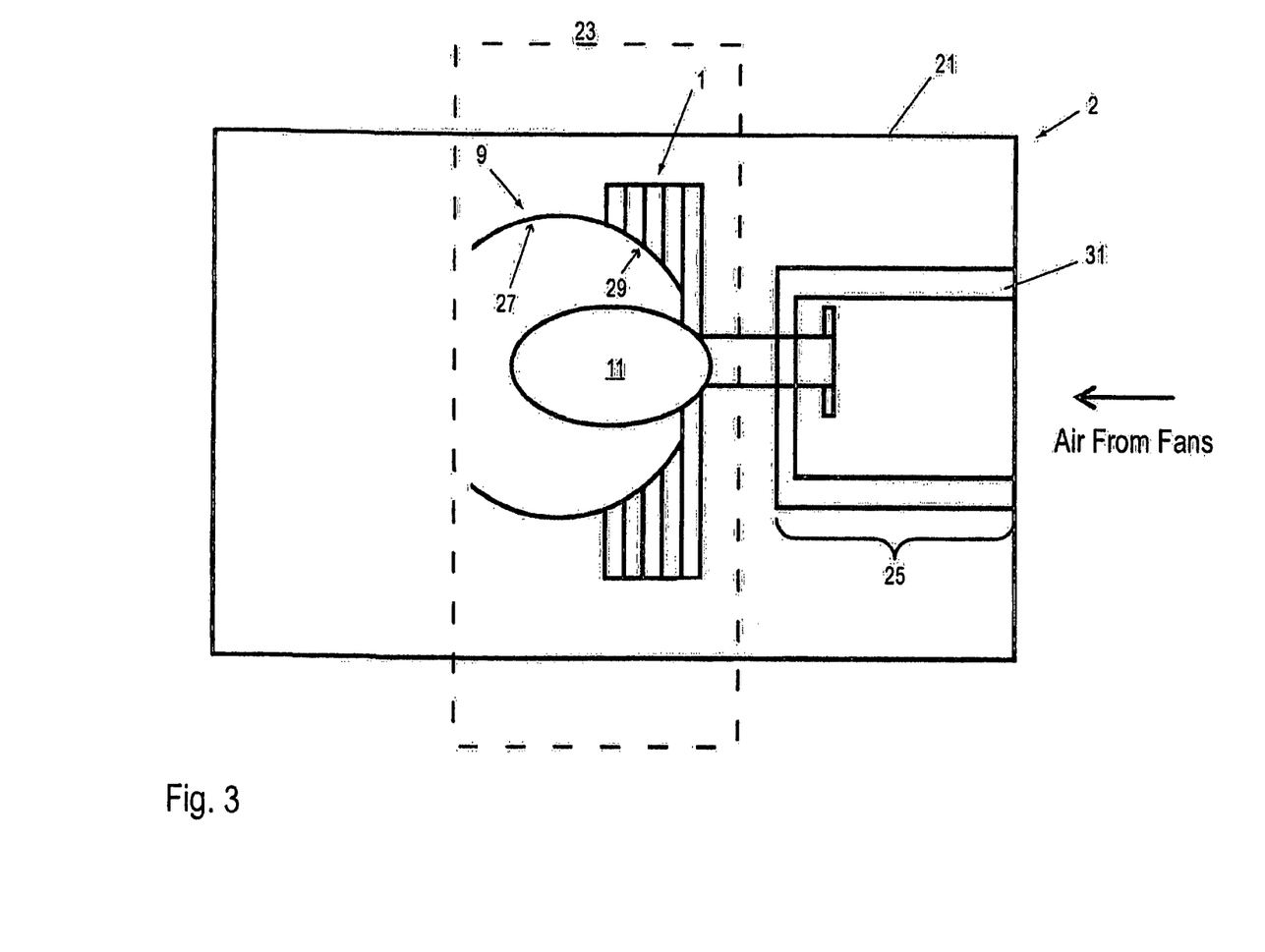
FIG. 3 shows schematically a side view of a projector with a cooling assembly installed therein.

As illustrated in FIG. 3, the reflector 9 and the lamp 11 are provided in a housing 21. The housing 21 is made of sheet metal, which has been laser cut to provide the necessary apertures. This sheet metal is then folded into the four faces, and welded together. Within the housing 21, there is a first subassembly 23 and a second subassembly 25.

The first subassembly 23 (the reflector assembly) comprises the reflector 9, which is made of front segment 27 and a rear segment 29. The first subassembly 23 further comprises the lamp 11 and the first assembly 1.

The second subassembly 25 (the lamphouse assembly) is defined by a double walled lamphouse box 31 inside of which the lamp 11 is mounted. The lamphouse box 31 comprises a second assembly 33 for performing additional cooling and to operate as a guard. The second assembly 25 comprises a first element 35 having a plurality of first elongate members 37; and a second element 39 having a plurality of second elongate members 41. The first and second elongate members 37, 41 extend radially outwardly. Air is preferably circulated between the double walls of the lamphouse box 31 to provide further cooling.

Figure 5:
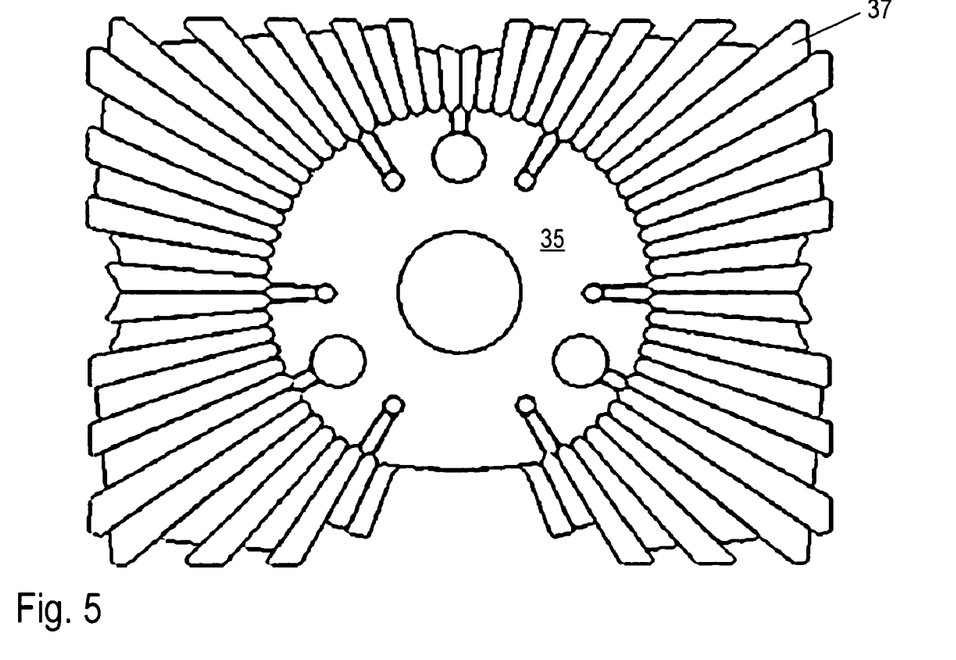
FIG. 5 shows a plan view of a second cooling assembly.
Figure 6:
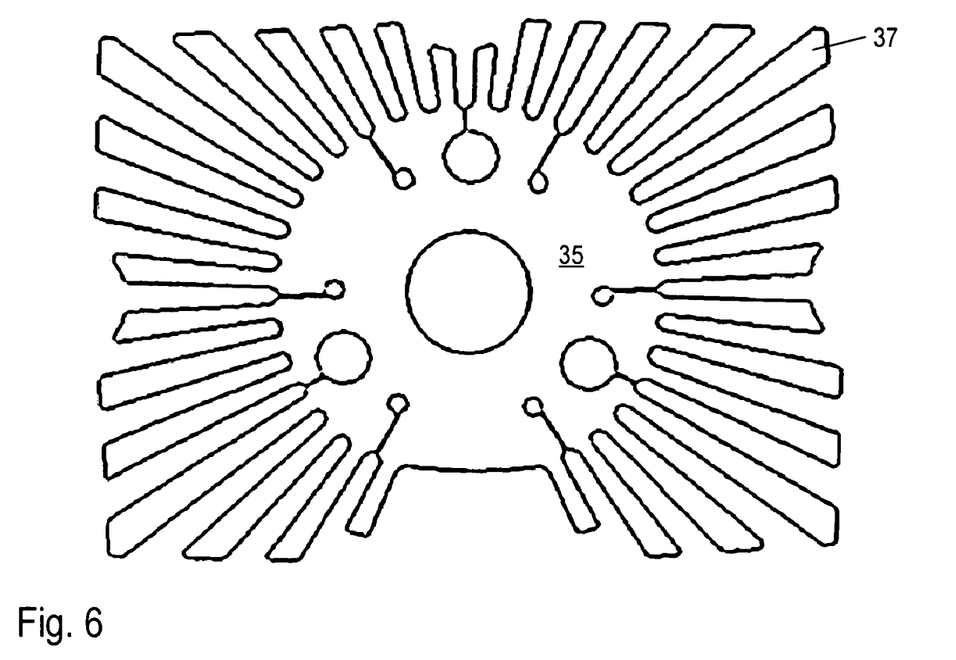
FIG. 6 shows a plan view of one of the elements from the second cooling assembly shown in FIG. 5.

As shown in FIGS. 4 and 5, the second elongate members 41 are arranged at least partially to obstruct the space provided between adjacent first elongate members 37. Conversely, the first elongate members are arranged at least partially to obstruct a space provided between adjacent second elongate members. This offset arrangement is particularly desirable since it reduces the likelihood of fragments escaping through a ventilation grill 43 in the event that the lamp 11 explodes. A plan view of the first element 35 is shown in FIG. 6.

Figure 7:
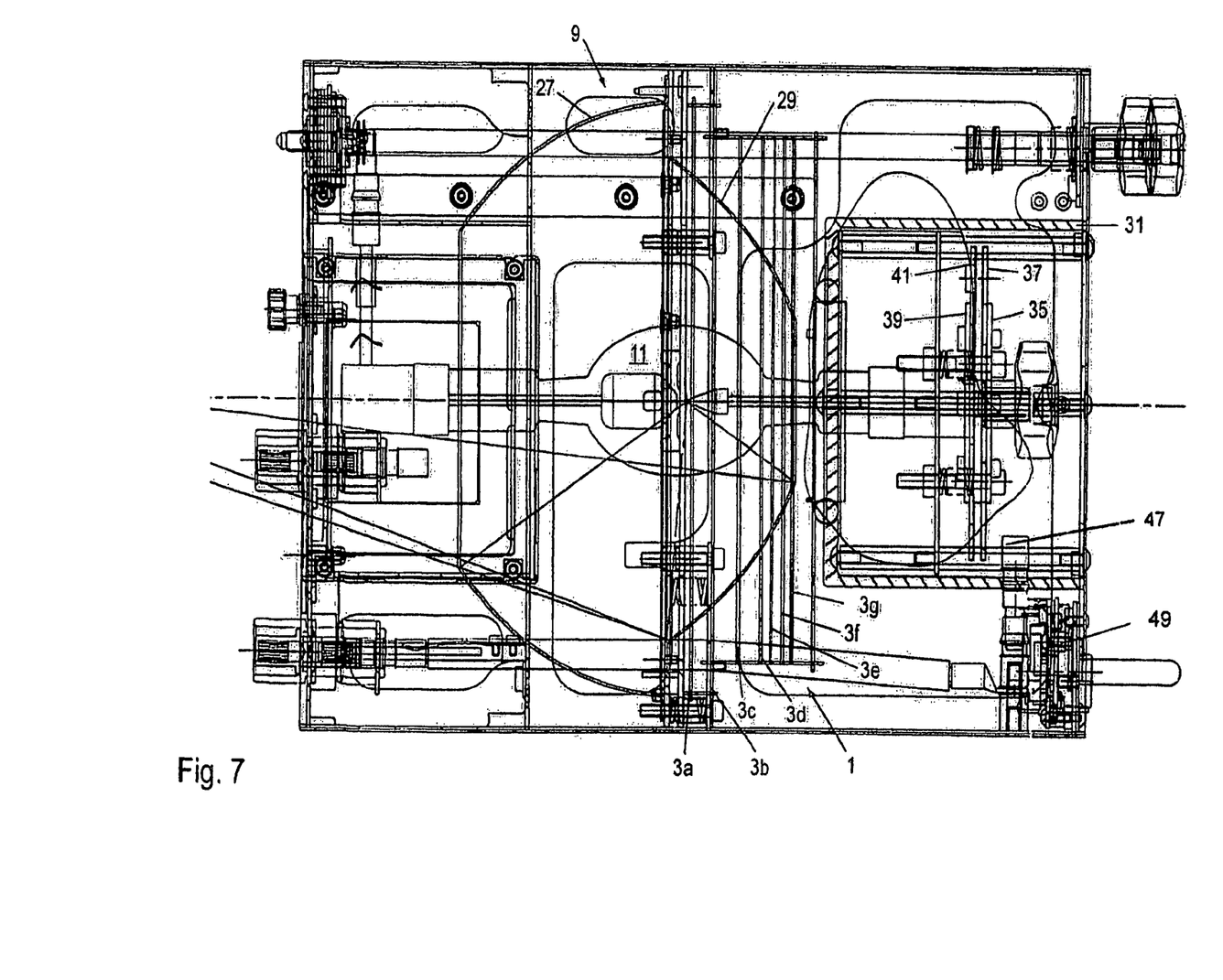
FIG. 7 shows a cross section of a projection system in accordance with the present invention.

A cross-sectional view of a projector system 2 incorporating the first assembly 1 and the second assembly 33 is shown in FIG. 7.

The arrangement of the first assembly 1 and the second assembly 33 are particularly effective at cooling the reflector 9 and the projector system 2 as a whole. The flow of air around the outside of the rear segment 29 of the reflector 9 is disturbed by the elongate members 7 and a turbulent flow is created. The turbulent airflow is particularly effective in dissipating heat from the reflector 9 before it exits the projector system 2. The life of the reflector may thereby be increased. The improved efficiency means that a larger, brighter lamp, which generates more light, may be used within a smaller and lighter projector. Thus, a brighter image can be projected.

The reduced temperatures in the projector system 2 advantageously also enables a photocell 47 to be provided proximal the lamp 11 accurately to measure when the lamp 11 is illuminated. The photocell is preferably mounted in the incoming airflow for cooling. This is considered to be patentable independently.

It is often desirable for projector systems 2 to provide a display of the total hours that a lamp (or other illumination module) has been used. This facilitates scheduling of replacement lamp installations at a time that is convenient, rather than waiting until lamp failure happens, which may be in the middle of a performance. Conventional lamp life meters are simple timers that record the 'hours' that power is provided to a lamp. Since this power to the lamp also provides power to the lamp life meter, the correct hours are recorded. However, if the power is left on, but the lamp for any reason has not 'struck' (high voltages are needed to get Xenon Arc lamps to illuminate from cold), then the meter will erroneously record lamp hours that are not 'real'.

The photocell 47 provided near the lamp collects light emitted from the lamp. When the photocell 47 detects light above a preset threshold, an hour meter 49 is driven without any external power supply requirements or other connections. When the light level recorded by the photocell 47 is below this threshold, the lamp is not lit and hours are not recorded. A display 45 is provided to indicate the total number of lamp hours for which the lamp 11 has been lit. The hour meter 49 may be powered by the photocell to avoid the need to provide a separate power source.

The hour meter 49 is preferably provided inside the lamphouse box 31. The lamphouse box 31 insulates the hour meter and protects it from the high temperatures in the projector system 2.

Photocells degrade rapidly in the presence of heat and electronic hour meters are not tolerant of high temperatures. The positioning of the photocell 47 in the incoming airflow helps to prevent this degradation. Thus yet a further advantage is that since the light source assembly can now be made to run at a lower temperature, this novel form of hour metering can be implemented.

Although the first assembly 1 is shown as surrounding only the rear section 29 of the reflector 9 in the present embodiment, it will be appreciated that it may be extended also to surround the front segment 27.

It will be appreciated that the present invention may be employed in any circumstance where it is beneficial to maintain an object at an overall uniform temperature regulated by a flow of fluid (such as air) and any system where high thermal contact from an object to a fluid without the use of a device like a heat sink or the constraints of a rigid cooling structure will benefit from the described practice. In the most closely related application to the cooling of reflectors, these are used with high power lamps (in relation to the reflector size) in cinema projectors, endoscopes, searchlights, some car headlights and epidiascopes to identify just a few applications, and this invention can help life and performance in many of these cases, both for metal and glass reflectors and of almost any size and shape given the extreme flexibility of the design.

Other examples of cooling applications arise in cooling systems for devices such as microprocessors and other electronic devices where there is a lot of power to transfer efficiently over a small area. This invention made to a suitable scale can provide a very high surface power transfer rate within these coolers allowing high performance either in airflow based coolers or liquid cooling blocks—the principles and needs are the same and the major limitation of having to conduct heat into cooling fins is avoided.

The underlying concept of creating intimate fluid to surface contact by multiple fingers may also be used to attain even temperatures over significant areas where the power loading is small, for example in reflector telescopes. These telescopes contain reflecting mirrors, very much like the ones in the previously described lamp houses. These mirrors may be of substantial size and are often made of many segments but in every case, to maintain focus, it is important that the mirror, or all segments of a segmented mirror, is at a constant and uniform temperature to retain form and focus. If air (at a desired temperature) is blown over the rear of the mirror, and members with fingers as described are in contact with the rear of the member, the mirror will obtain a more even temperature, it will be able to retain that temperature better as surrounding conditions change, and it will be able to respond more uniformly to changes in temperature.

It will be appreciated that by passing a fluid at an elevated temperature through the apparatus described herein that it is also possible to heat an object. The use of the apparatus for heating an object may be desirable when it is adapted for use in conjunction with a telescope reflector. A heater may be provided to supply fluid at the desired temperature.

In some circumstances, it may be desirable to use cooling media other than air as the heat transfer agent. For example, to cool the reflector in a sealed arc lamp assembly, heavy gases such as Neon or Xenon may be desirable for their high thermal transfer potential, especially where such gases are present for other reasons. Fluids such as water are useful where higher heat transfer rates are needed, as are fluids such as refrigerants in cooling applications.

The term "lamp" has been used throughout the present application for consistency. However, it will be appreciated that this term is intended also to cover bulbs and other light sources.

The invention claimed is:

1. Apparatus for transferring heat between an object and a fluid, the apparatus comprising at least one set of elongate members, the elongate members each having a distal end having a tip configured to make a point contact with the object and allowing heat to be transferred between the object and the fluid by creating localized turbulence against a surface of the object.

2. Apparatus as claimed in claim 1, wherein the elongate members in the set or each set are substantially co-planar.

3. Apparatus as claimed in claim 1 comprising a plurality of sets of elongate members, wherein the elongate members in adjacent sets are substantially parallel.

4. Apparatus as claimed in claim 1, wherein the elongate members extend in a radial direction.

5. Apparatus as claimed in claim 1, wherein the tips of the elongate members in the set or in each set define a circle in plan form.

6. Apparatus as claimed in claim 1, wherein the tips of the elongate members in adjacent sets are arranged concentrically.

7. Apparatus as claimed in claim 1, wherein the elongate members in the set or each set extend from a support member.

8. Apparatus as claimed in claim 7, wherein the elongate members in the set or each set extend inwardly.

9. Apparatus as claimed in claim 7, wherein the support member(s) is mounted in a frame.

10. Apparatus as claimed in claim 9, wherein the support member(s) is movable relative to the frame.

11. Apparatus as claimed in claim 1, wherein the tip of each elongate member is rounded.

12. Apparatus as claimed in claim 1, wherein the width of each elongate member is substantially uniform along its length.

13. Apparatus as claimed in claim 1 further comprising alignment means for aligning the object.

14. Apparatus as claimed in claim 13, wherein the alignment means is formed by a shape detail on the outer edges of the set.

15. Apparatus as claimed in claim 1, wherein the set or each set of elongate members is formed from a single piece of sheet material.

16. Apparatus as claimed in claim 15, wherein the sheet material is aluminum.

17. Apparatus as claimed in claim 16, wherein the aluminum is anodised.

18. Apparatus as claimed in claim 1 further comprising a fan or a pump for circulating a fluid around the elongate members.

19. Apparatus as claimed in claim 1, wherein the object is a reflector for a lamp.

20. A projector comprising apparatus as claimed in claim 1.

21. A projector as claimed in claim 20 further comprising a fan for circulating fluid around the elongate members.

22. A projector as claimed in claim 21 further comprising a splitter for splitting the fluid flow from the fan into first and second components to flow around a reflector.

23. A projector as claimed in claim 22, wherein the first component of the fluid flow is directed to the exterior of the reflector.

24. A projector as claimed in claim 22, wherein the second component of the fluid flow is directed to the interior of the reflector.

25. A projector as claimed in claim 22, wherein the splitter comprises a baffle plate.

26. A projector as claimed in claim 20 further comprising a photocell for determining when a lamp is illuminated, and a time recording device for recording the time when the lamp is illuminated as determined by the photocell.

27. A projector as claimed in claim 26, wherein the photocell and/or time recording device are provided inside an insulated housing.

* * * * *